T. D. MONTGOMERY & L. C. SCHANTZ.
WELDING CONTROLLER.
APPLICATION FILED JULY 21, 1916.
1,253,198.
Patented Jan. 8, 1918.
3 SHEETS—SHEET 1.
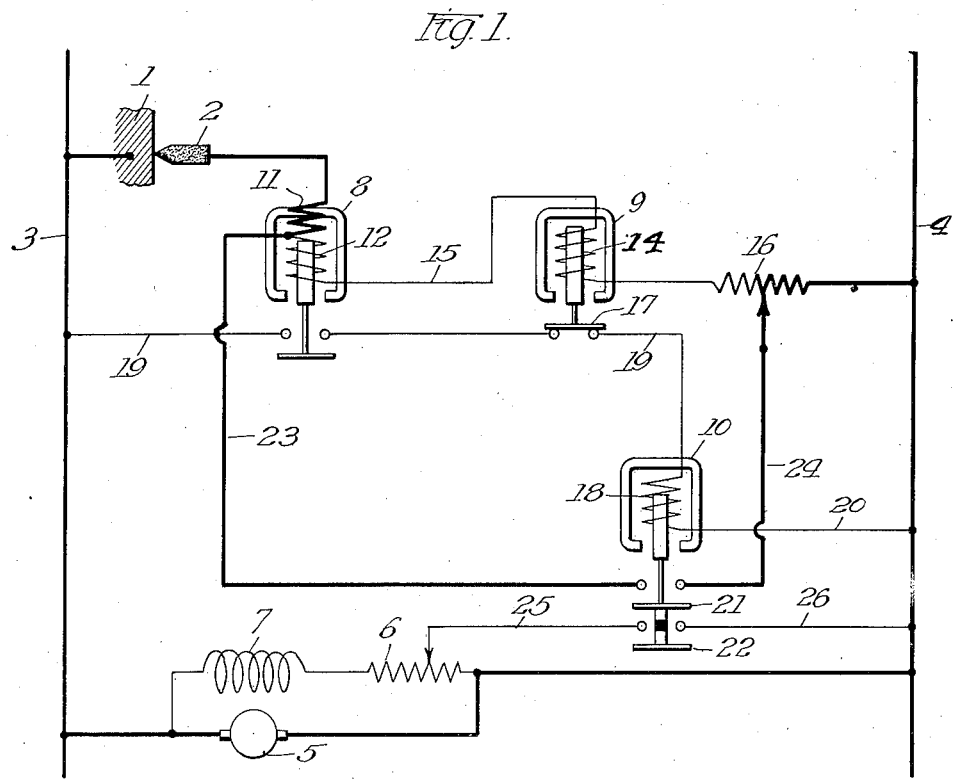
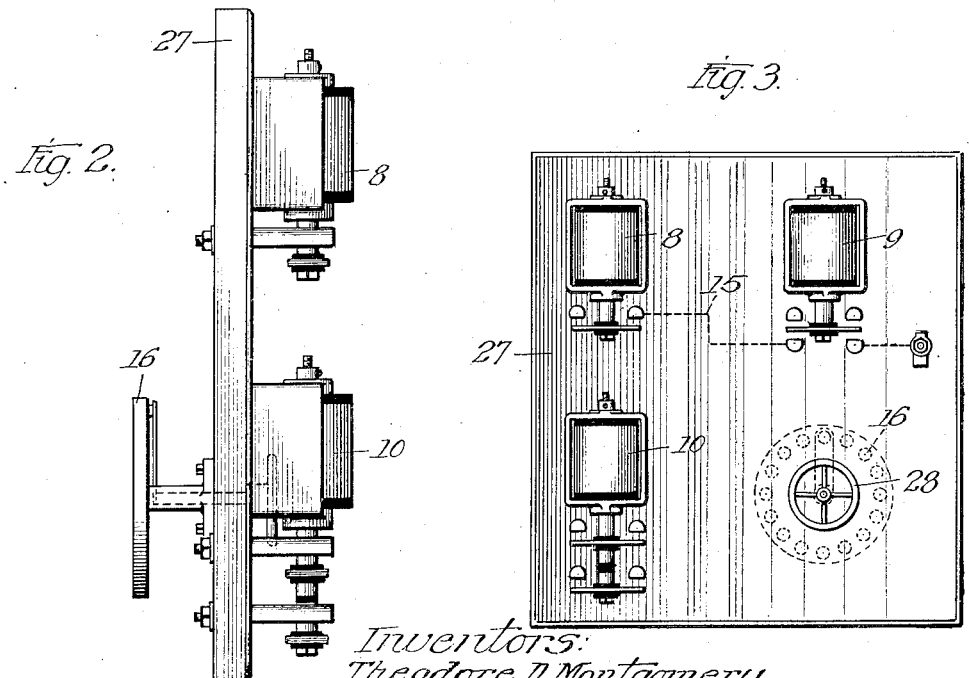
Inventors:
Theodore D. Montgomery
Leroy C. Schantz
By Edwin B. H. Tower Jr. Atty.

T. D. MONTGOMERY & L. C. SCHANTZ.
WELDING CONTROLLER.
APPLICATION FILED JULY 24, 1916.
1,253,198.
Patented Jan. 8, 1918.
3 SHEETS—SHEET 2.
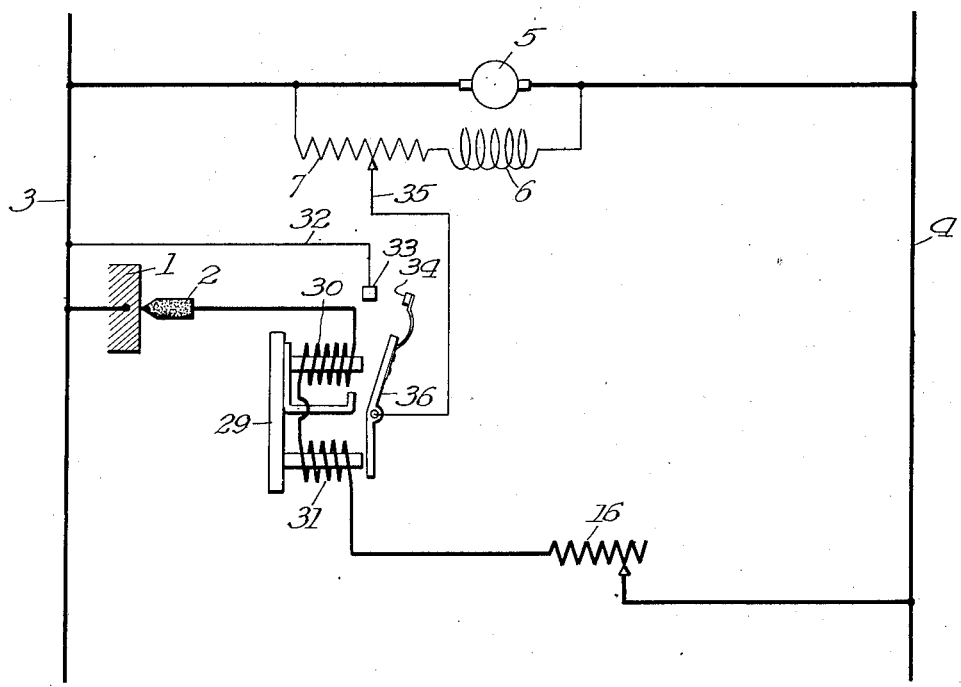
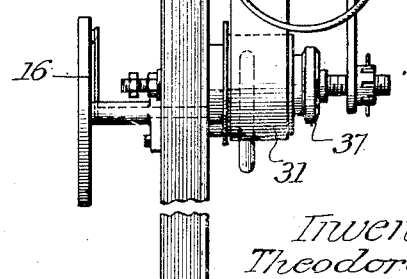
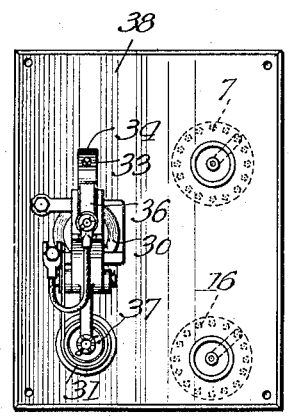
Inventor
Theodore D. Montgomery
Leroy C. Schantz
By Edwin B. H. Power Jr. Atty.

T. D. MONTGOMERY & L. C. SCHANTZ.
WELDING CONTROLLER.
APPLICATION FILED JULY 21, 1916.
1,253,198.
Patented Jan. 8, 1918.
3 SHEETS—SHEET 3.
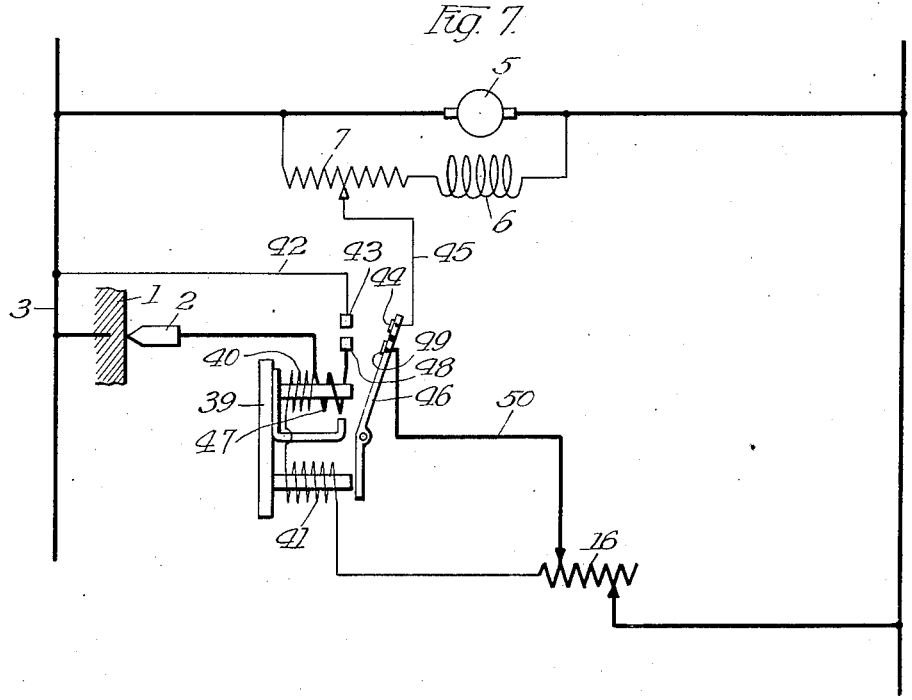
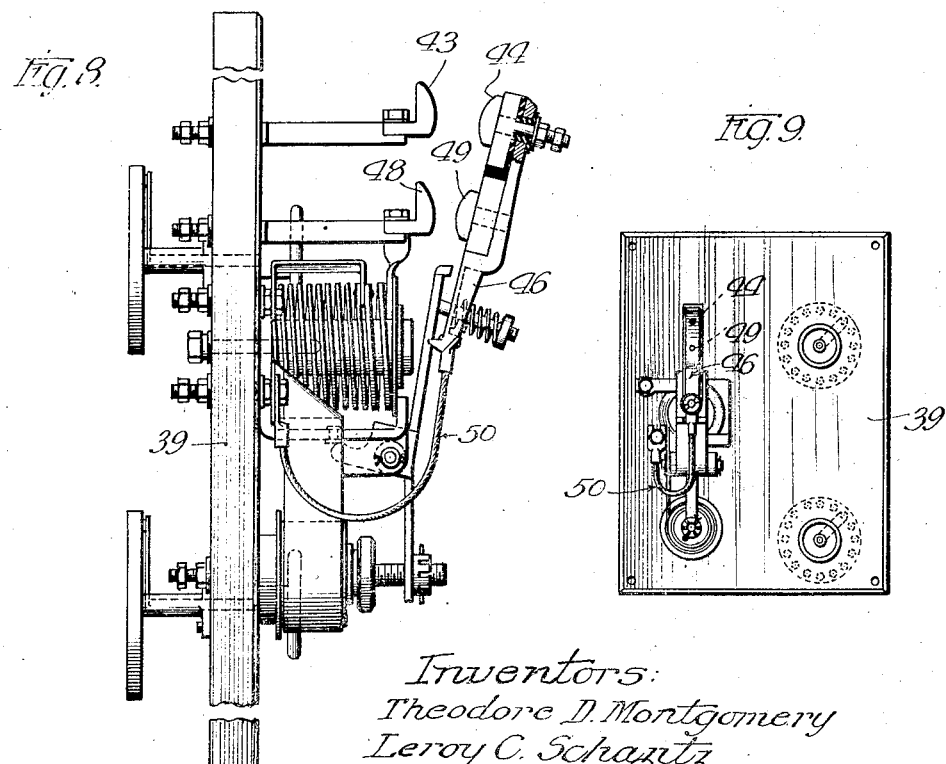
Inventors:
Theodore D. Montgomery
Leroy C. Schantz
By Edwin B. H. Power Jr. Atty.

UNITED STATES PATENT OFFICE.

THEODORE D. MONTGOMERY, OF EAST ORANGE, NEW JERSEY, AND LEROY C. SCHANTZ, OF MILWAUKEE, WISCONSIN, ASSIGNORS TO THE CUTLER-HAMMER MFG. CO., OF MILWAUKEE, WISCONSIN, A CORPORATION OF WISCONSIN.

WELDING-CONTROLLER.

1,253,198.     Specification of Letters Patent.     Patented Jan. 8, 1918.

Application filed July 21, 1916. Serial No. 110,499.

*To all whom it may concern:*

Be it known that we, THEODORE D. MONTGOMERY and LEROY C. SCHANTZ, citizens of the United States, residing, respectively, in East Orange, in the county of Essex and State of New Jersey, and in Milwaukee, in the county of Milwaukee and State of Wisconsin, have invented new and useful Improvements in Welding - Controllers, of which the following is a specification.

The invention relates to welding controllers.

The system of electric welding known as arc welding generally involves striking an arc between two electrodes, or between the object to be welded and an electrode and using the heat of the arc for bringing the object to a welding temperature. The arc is usually obtained by completing the welding circuit by means of the electrodes and subsequently separating the electrodes to draw an arc. In order to prevent an excessive rush of current when the circuit is first completed, some means must be provided for limiting the power supply to the electrodes when the resistance of the arc is small. This is sometimes done by placing a resistance in series with the electrodes and removing the resistance after the arc has been drawn. The present invention relates more particularly to a controller in which the voltage of the power supply is decreased when the resistance of the arc is small and after the arc is formed the voltage is increased to give a proper welding current.

One of the objects of the invention is to provide an improved welding controller in which the power supply to the electrodes is limited when the resistance of the arc is small.

Another object is to provide an improved controller which automatically operates to increase the power supply to the electrodes after the arc is established.

Other objects and advantages of the invention will hereinafter appear.

Several embodiments of the invention are shown in the accompanying drawings. The views of the drawings are as follows:

Figure 1 is a diagrammatic view of a welding controller embodying the invention.

Figs. 2 and 3 are side and front elevation views respectively of the controller as it is mounted on a panel board.

Fig. 4 is a diagrammatic view of another embodiment of the invention.

Figs. 5 and 6 are side and front elevation views respectively of the controller shown in Fig. 4 mounted on a panel board.

Fig. 7 is a diagrammatic view of another form of the controller.

Figs. 8 and 9 are side and front elevation views respectively of the controller of Fig. 7 mounted on a panel board.

The controller shown in Figs. 1, 2 and 3 will first be described.

The controller comprises, in general, electrodes 1 and 2, which are connected across the power mains 3 and 4 to which power is supplied by a generator 5 having resistance 6 in series with its shunt field winding 7, and a series of automatic switches 8, 9 and 10 for removing the resistance after the arc has been drawn and its resistance has increased.

The electrode 1 generally constitutes the object to be welded, though it may be another electrode which is brought into engagement with the electrode 2 to complete the circuit and draw an arc.

The electrode 2 comprises a movable carbon or metal terminal which is used to engage the electrode 1 to complete the welding circuit and draw an arc.

The generator 5 may be of any suitable type, preferably a shunt field generator having a resistance 6 normally in series with the shunt field. The generator is designed to give a proper voltage for arc welding purposes. The resistance 6 in series with the shunt field 7 is controlled by switches 8, 9 and 10 in a manner which will be hereinafter described.

The switches 8, 9 and 10 are illustrated as of the plunger type. Each comprises a suitable solenoid winding inclosed by a magnetic frame, the solenoid acting on a plunger which carries a contact for controlling a circuit or circuits.

The winding of switch 8 is divided into two sections, an upper section 11 of few turns and large capacity for holding the switch closed and a lower section 12 of a larger number of turns and smaller capacity for coöperating with the section 11 to close the switch. The switch plunger carries a bridging contact for completing a circuit 19 to the switch 10. The switch 8 is normally biased to open position so that said circuit 19 is normally open and the switch 10 inactive. The switch 8 is preferably made sluggish so that it will not close its contacts too rapidly.

The switch 9 has a winding 14 which is connected by a conductor 15 in series with the windings 11 and 12 of switch 8 and in series with an adjustable resistance 16, the latter acting as a steadying resistance for the controller. The plunger of switch 9 carries a bridging contact 17 which opens and closes the circuit 19 to the switch 10. The switch 9 is normally biased to a position to close the contacts in the circuit of switch 10. The relay or switch 9 is relatively quick acting as compared with switch 8 so that it will operate before the switch 8 has had time to act. When the circuit of the two switches 8 and 9 is closed the switch 9 thus opens the voltage circuit 19 of switch 10 at one point before the switch 8 has an opportunity to close it at the point where it is normally open.

The switch 10 has a winding 18 connected across the mains 3 and 4 by conductors 19 and 20, the conductor 19 being normally open circuited by the switch 8 and normally closed by the switch 9.

The winding 18 of switch 10 controls a plunger carrying two bridging contacts insulated from each other, the contact 21 being adapted to close a circuit around the switches 8 and 9 and the contact 22 being adapted to close a circuit to exclude a portion of the resistance 6 in series with the shunt field of the generator.

The contact 21 is adapted to close a circuit around the switches 8 and 9, said circuit comprising a conductor 23 connected to the juncture of the windings 11 and 12 of switch 8 and a conductor 24 connected to the arm of the adjustable resistance 16.

The contact 22 is adapted to close the circuit for excluding a portion of the resistance 6 in series with the shunt field 7 of the generator, said circuit comprising a conductor 25 connected to an adjustable arm on the resistance 6 and a conductor 26 connected to the main 4.

The operation of the controller is as follows:

When the circuit is completed by the electrodes 1 and 2, current flows through the windings 11 and 12 of switch 8, the conductor 15, the winding 14 of switch 9 and the resistance 16 to main 4. The resistance between the electrodes 1 and 2 when the circuit is completed is very small and a heavy current tends to flow. This current causes the winding 14 of switch 9 to lift the plunger of switch 9 and open the circuit 19 of switch 10. The action of the switch 9 is rapid. The current flowing through the windings 11 and 12 also causes them to lift the plunger of switch 8 and close the circuit of conductor 19 but the switch 9 having acted more quickly than switch 8 has already opened the circuit 19 at another point so that the switch 10 is not energized.

The current through the electrodes at this time is limited by reason of the fact that all of the resistance 6 is in series with the shunt field of the generator and the voltage is relatively low.

As the arc between the electrodes is drawn and its resistance increases the current decreases until at a predetermined value the switch 9 allows its plunger to drop and the circuit of switch 10 is completed. The switch 8 is designed so that it does not drop out except for very low current values. The completion of the circuit 19 energizes winding 18 of switch 10 and its plunger is drawn up, which operation causes the bridging contact 22 to complete the circuit 25, 26 to shunt a portion of the resistance 6 and thereby increase the voltage of the generator so as to give a higher voltage across the arc and a consequent heavier current for welding purposes. As the switch 10 closes the contact 21 completes the circuit 23, 24 from winding 11 around the switch 8, the current through the winding 11 being sufficient to keep the switch closed. The main welding current thus flows from the main 3 through the electrodes 1 and 2, the winding 11, conductor 23, 24, resistance 16 to main 4.

When the welding circuit is interrupted the winding 11 is deënergized and the plunger of switch 8 drops thereby opening the circuit 19 and deënergizing the switch 10 which thereupon moves to open position and reinserts the resistance in the shunt field of the generator. The controller is then again in condition for another operation.

The switches 8, 9 and 10 and the rheostat 16 are preferably mounted upon a panel board 27 as illustrated in Figs. 2 and 3. The rheostat 16 is provided with an adjustable regulating wheel 28 for varying the steadying resistance in series with the electrodes. The assembly of various elements on a single panel board gives a neat, compact and readily accessible controller which may be mounted in a convenient location.

The controller shown in Figs. 4, 5 and 6 operates upon the same general principle as the controller just described; that is, a resistance is removed from the shunt field of the generator supplying energy to the electrodes after the arc is drawn. In this form, however, a different automatic means for excluding the resistance is employed.

The electrodes 1 and 2 are connected across the supply mains 3 and 4 to which energy is supplied by a generator 5 having a shunt field 6 provided with a resistance 7 in series therewith. A portion of the resistance 7 in series with the shunt field is excluded by means of an automatic switch 29.

This automatic switch has windings 30 and 31 connected in series with the electrodes 1 and 2 and in series with the adjustable steadying resistance 16. The switch is adapted to remain open when it is intially highly energized and to close when its energization decreases to a predetermined value. It is known as a lockout switch and its construction will be briefly described.

The switch has two operating windings 30 and 31 connected in series and magnetically independent. Winding 30 acts to close the switch and winding 31 to hold it open. Pivoted between the windings is a movable member 36 carrying the contact 33 which is adapted to engage the stationary contact 34. The upper part of this movable member constitutes an armature for the core of winding 30. The lower end of the member carries an armature 37 adapted to be attracted by the core of winding 31. The movable member is normally biased to the position shown in Fig. 5.

In order that the switch will remain open when an initially high current flows through the windings and close when the current decreases to a predetermined value, the windings are constructed so as to have different pull characteristics. The pull of winding 30 for closing the switch lags behind the current whereas the pull of winding 31 for holding the switch open rises very quickly with an increase in current. Consequently, when an initially high current is passed through the windings, the pull of the holding winding 31 increases more rapidly than that of the closing winding 30 and the switch remains open. As the current through the windings decreases the pull of the holding winding 31 decreases more rapidly than that of the closing winding 30 until a point is reached where the closing winding predominates over the holding winding and closes the switch.

The operation of this controller is as follows:

When the circuit is completed by the electrodes 1 and 2 current flows from the main 3 through the electrodes 1 and 2, windings 30 and 31 and the steadying resistance 16 to the main 4. The initially high current which flows when the circuit is first completed causes the switch 29 to remain open. The entire resistance 7 is thus in series with the field of the generator and the voltage supplied to the electrodes is relatively low. As the arc is drawn and its resistance increases, the current through the windings 30 and 31 of the switch decreases until a point is reached where the switch 29 automatically closes. When the switch closes a circuit is completed from the main 3 through the conductor 32 to the contacts 33 and 34, the conductor 35 to the shunt field resistance 7. A section of said resistance is thus short-circuited. The voltage of the generator accordingly increases and furnishes a larger current for welding purposes. When the welding circuit is broken the windings 30 and 31 are deënergized and the switch automatically returns to open position. The controller is thus again in condition for operation.

The automatic switch 29 and the steadying resistance 16 are mounted on a suitable panel board 38 as shown in Figs. 5 and 6. The shunt field resistance 7 may also be mounted on said board if desired.

The controller shown in Figs. 7, 8 and 9 is similar to that shown in Figs. 4, 5 and 6 except that a different form of automatic switch is employed.

This controller has electrodes 1 and 2 connected across mains 3 and 4 supplied with power by a generator 5 having shunt field 6 with the resistance 7 in series therewith. A portion of the shunt field resistance 7 is shunted by an automatic switch 39 which will be hereinafter described.

The electrodes 1 and 2 are connected in series with the windings 40 and 41 of the automatic switch 39 and the steadying resistance 16. When the automatic switch is closed a circuit is completed from the main 3 through the conductor 42, the contacts 43 and 44 of the switch and the conductor 45 to the shunt field resistance 7. A portion of said resistance is thus excluded from the shunt field circuit.

The automatic switch is of the same general construction as that shown and described in Fig. 5; that is, it is constructed so that it will remain open when initially highly energized and closed when its energization decreases to a predetermined value. In addition it has a winding 47 for holding the switch closed after it has been moved to closed position by the winding 40. This winding is mounted on the same core as the winding 40 and acts on the upper end of the movable member 46 to keep the switch in closed position. One end of this winding is connected to the conductor leading from the electrode 2 and the other end to the stationary contact 48 with which coöperates a movable contact 49 which is insulated from contact 44 and connected by a conductor 50 to the adjustable resistance 16.

When the switch is closed current flows from the main 3 through electrodes 1 and 2, winding 47, contacts 48 and 49, the conductor 50 and the resistance 16 to the main 4. Winding 47 holds the switch closed and the windings 40 and 41 are practically short-circuited since their resistance is higher than that of the winding 47. Also a section of the resistance 16 may be included in series with windings 40 and 41.

This construction avoids the necessity for the entire welding current being carried by the windings 40 and 41 of the switch. Winding 47 may comprise a few turns of heavy copper strips of ample capacity to carry the welding current and at the same time hold the switch closed.

The operation of this controller is practically the same as that of the controller shown in Figs. 4, 5 and 6 except that after the switch 39 is closed, the winding 47 instead of the operating winding holds the switch closed. When the welding circuit is broken the winding 47 is deënergized and the switch automatically returns to open position.

It is to be understood that the structure shown is for purposes of illustration only and that other structures may be devised which come within the spirit and scope of the appended claims.

What we claim and desire to secure by United States Letters Patent is:—

1. In an electric arc welding system, a source of energy, connections from said source to the welding electrodes, and means responsive to the current in the circuit of the electrodes for increasing the voltage of the source of energy when the current in the electrode circuit decreases from an initially high value to a predetermined lower value.

2. A welding system having welding electrodes supplied with power from an electric generator, and means responsive to the current in the circuit of the electrodes for increasing the voltage of the generator after the current has decreased from an initially high value to a predetermined lower value.

3. A welding system having welding electrodes supplied with power from an electric generator, and means responsive to the current in the circuit of the electrodes for increasing the voltage of the generator, said means being adapted to positively act to prevent the generator voltage being increased when the welding circuit is completed and the current is high and acting to increase the voltage when the current decreases to a predetermined value.

4. A welding system provided with welding electrodes supplied with power from an electric generator, and means in the circuit of the electrodes for increasing the voltage of the generator after the electrodes have been separated to draw an arc.

5. In a welding system, a pair of welding electrodes supplied with power from a generator having a resistance normally in series with the shunt field and automatic means responsive to the current in the circuit of the electrodes for excluding a portion of the resistance to increase the voltage of the generator after the electrodes have been separated to draw an arc.

6. A controller for controlling the power supply to the electrodes in an arc welding system, comprising means by which the voltage of the power supply may be varied and means responsive to the current in the circuit of the electrodes for controlling the voltage varying means.

In witness thereof, we have hereunto subscribed our names.

THEODORE D. MONTGOMERY.
LEROY C. SCHANTZ.